US012620301B2

(12) United States Patent
Moon

(10) Patent No.: US 12,620,301 B2
(45) Date of Patent: May 5, 2026

(54) APPARATUS FOR CHECKING A CHILD IN VEHICLE AND A METHOD THEREOF

(71) Applicants: HYUNDAI MOTOR COMPANY, Seoul (KR); KIA CORPORATION, Seoul (KR)

(72) Inventor: Seong Jin Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 228 days.

(21) Appl. No.: 18/230,976

(22) Filed: Aug. 7, 2023

(65) Prior Publication Data
US 2024/0275602 A1 Aug. 15, 2024

(30) Foreign Application Priority Data
Feb. 13, 2023 (KR) ........................ 10-2023-0018796

(51) Int. Cl.
G08B 21/22 (2006.01)
H04L 9/32 (2006.01)

(52) U.S. Cl.
CPC ............ G08B 21/22 (2013.01); H04L 9/3226 (2013.01)

(58) Field of Classification Search
CPC .............................. G08B 21/22; H04L 9/3226
USPC ........................................................ 340/457
See application file for complete search history.

(56) References Cited

U.S. PATENT DOCUMENTS

| | | | | |
|---|---|---|---|---|
| 5,128,651 A | * | 7/1992 | Heckart ................... | G08B 3/10 |
| | | | | 340/433 |
| 5,243,323 A | * | 9/1993 | Rogers ................... | B60Q 9/001 |
| | | | | 340/433 |
| 5,874,891 A | * | 2/1999 | Lowe ....................... | B60Q 1/52 |
| | | | | 340/433 |
| 6,259,358 B1 | * | 7/2001 | Fjordbotten ............. | B60Q 9/00 |
| | | | | 307/10.6 |
| 2003/0014166 A1 | * | 1/2003 | Chinigo ........... | B60R 21/01512 |
| | | | | 340/433 |
| 2003/0030550 A1 | * | 2/2003 | Talbot ...................... | B60Q 9/00 |
| | | | | 340/433 |
| 2003/0132842 A1 | * | 7/2003 | Chia-Yen ............... | G08B 21/24 |
| | | | | 340/568.1 |
| 2006/0212195 A1 | * | 9/2006 | Veith ...................... | G06Q 10/06 |
| | | | | 701/33.4 |

(Continued)

FOREIGN PATENT DOCUMENTS

| | | |
|---|---|---|
| CN | 111476920 A | 7/2020 |
| KR | 101946290 B1 | 2/2019 |

(Continued)

*Primary Examiner* — Zhen Y Wu
(74) *Attorney, Agent, or Firm* — Lempia Summerfield Katz LLC

(57) ABSTRACT

The present disclosure relates to a child checking apparatus and a method therefor. A child checking apparatus includes a processor configured to transmit an authentication response message corresponding to an authentication request message if the authentication request message is received from a switch device after a vehicle is turned off and to determine whether the switch device operates within a predetermined time period to issue a warning. The child checking apparatus also includes a storage configured to store data driven by the processor, an algorithm, and a PIN code for encryption.

19 Claims, 6 Drawing Sheets

(56)          References Cited

U.S. PATENT DOCUMENTS

2010/0151831  A1*   6/2010   Hao  ................. H04M 3/53325
                                                                        455/412.2
2010/0214096  A1*   8/2010   Cheng  ................... B60R 25/00
                                                                        340/539.32
2012/0119877  A1*   5/2012   Ng  .................... G07C 9/00571
                                                                        70/276
2020/0290567  A1*   9/2020   Funyak  ................ B60R 25/102
2022/0019356  A1*   1/2022   Hong  .................. G06F 3/0637
2022/0254201  A1*   8/2022   Yamaguchi  ........... G07C 5/085
2023/0242076  A1*   8/2023   Lee  ........................ B60R 25/23
                                                                        340/5.52

FOREIGN PATENT DOCUMENTS

KR          101958238  B1     7/2019
KR          20200019320  A     2/2020
KR          20200048199  A     5/2020

* cited by examiner

<301>          <302>          <303>

APPARATUS FOR CHECKING A CHILD IN VEHICLE AND A METHOD THEREOF

CROSS-REFERENCE TO RELATED APPLICATION

This application claims priority to and the benefit of Korean Patent Application No. 10-2023-0018796 filed in the Korean Intellectual Property Office on Feb. 13, 2023, the entire contents of which are incorporated herein by reference.

BACKGROUND

(a) Technical Field

The present disclosure relates to a child checking apparatus and a method therefor, and more particularly, to a technique for preventing illegal modification of a child checking apparatus.

(b) Description of the Related Art

Various devices for children are being developed and used to prevent crimes against children or missing children.

Particularly, as problems such as accidents occurring due to neglect of a sleeping child in a vehicle have occurred one after another, recently, some countries laws have required the installation of a device for checking for a sleeping child in a vehicle.

The device for checking for the sleeping child uses a method in which a driver must press a switch (confirmation button) installed in a rearmost row of the vehicle to confirm whether the child is getting out of the vehicle within 3 minutes after stopping the vehicle and turning off the engine. If the button is not pressed, a warning sound is generated or output and an indicator light or an emergency flashing light is displayed.

However, there are frequent cases in which users illegally modify the switch of the device that checks for the sleeping child and change the switch installed in a rear row to an arbitrary switch in the front, thereby reducing the effect.

The above information disclosed in this Background section is only to enhance understanding of the background of the disclosure. Therefore, the Background section may contain information that does not form the prior art that is already known to a person of ordinary skill in the art.

SUMMARY

Embodiment have been described in an effort to provide a child checking apparatus and a method therefor that are capable of fundamentally preventing illegal modification of the child checking apparatus by changing a switch device of the child checking device to communication-type software and preventing abuse by applying a seed key encryption algorithm.

The technical objects of the present disclosure are not limited to the objects mentioned above. Other technical objects not mentioned should be more clearly understood by those having ordinary skill in the art from the description of the claims.

An embodiment of the present disclosure provides a child checking apparatus including a processor configured to transmit an authentication response message corresponding to an authentication request message if the authentication request message is received from a switch device after a vehicle is turned off. The processor is also configured to determine whether the switch device operates within a predetermined time period to issue a warning. The present disclosure also provides a storage configured to store data driven by the processor, an algorithm, and a PIN code for encryption.

In an embodiment of the present disclosure, the child checking apparatus may further include a communication device configured to communicate with the switch device to transmit and receive a message for checking for a sleeping child in a vehicle.

In an embodiment of the present disclosure, the processor may be configured to enter a warning mode and to start a timer count after the vehicle key is turned off.

In an embodiment of the present disclosure, the processor may be configured to compare a PIN code included in the authentication request message with the PIN code stored in the storage.

In an embodiment of the present disclosure, the processor may be configured to perform a visual warning or an audible warning if the PIN code included in the authentication request message and the PIN code stored in the storage unit do not match.

In an embodiment of the present disclosure, the processor may be configured to transmit a lamp lighting command signal to the switch device if the PIN code included in the authentication request message and the PIN code stored in the storage match.

In an embodiment of the present disclosure, the processor may be configured to generate the authentication response message corresponding to the authentication request message if the PIN code included in the authentication request message and the PIN code stored in the storage match.

In an embodiment of the present disclosure, the processor may be configured to calculate and encrypt random data and a predetermined constant in the authentication request message and to store the encrypted random data in the authentication response message.

In an embodiment of the present disclosure, the processor may be configured to calculate and encrypt the PIN code and the encrypted random data in the authentication request message and to store encrypted calculated data in the authentication response message.

In an embodiment of the present disclosure, the processor may be configured to calculate and encrypt 1 to 4 bytes of data and a predetermined constant in the authentication request message and to store the encrypted data in 1 to 4 byte positions of the authentication response message.

In an embodiment of the present disclosure, the processor may be configured to calculate and encrypt data of 5 to 8 bytes of the authentication request message and 1 to 4 bytes of the authentication response message and to store the encrypted data in 5 to 8 byte positions of the authentication response message.

In an embodiment of the present disclosure, the processor may be configured to input a PIN code that is matched one-to-one with a vehicle identification number if a vehicle is manufactured at a factory.

In an embodiment of the present disclosure, the PIN code may be the same as the PIN code stored in the switch device.

An embodiment of the present disclosure provides a child checking apparatus including a processor configured to transmit an authentication request message to a vehicle control device after a vehicle key is turned off. The processor is also configured to determine whether to transmit switch information to the vehicle control device by using an authentication response message for the authentication request message received from the vehicle control device. The child checking apparatus also includes a storage configured to store data driven by the processor, an algorithm, and a PIN code for encryption.

In an embodiment of the present disclosure, the child checking apparatus may further include a communication device configured to communicate with the vehicle control device to transmit and receive a message for checking for a sleeping child in a vehicle.

In an embodiment of the present disclosure, the processor may be configured to compare a PIN code of the authentication response message with a PIN code stored in the storage in receiving the authentication response message, to transmit switch information if they match and to transmit no switch information if they do not match.

In an embodiment of the present disclosure, the processor may be configured to light a lamp of the switch device if the PIN code of the authentication response message and the PIN code stored in the storage match and to receive a lamp lighting command signal from the vehicle control device.

In an embodiment of the present disclosure, the processor may be configured to convert the PIN code matching the vehicle identification number into a hexadecimal value and to calculate the PIN code and the random data to encrypt the PIN code to store the encrypted PIN code in the authentication request message.

An embodiment of the present disclosure provides a child checking method including: receiving, by a processor, an authentication request message from a switch device after a vehicle key is turned off; transmitting, by the processor, an authentication response message corresponding to the authentication request message; determining, by the processor, whether the switch device operates within a predetermined time period; and performing, by the processor, a warning according to a determination result thereof.

According to the present technique, it is possible to fundamentally prevent illegal modification of a child checking apparatus by changing a switch device of the child checking device to communication-type software and to prevent abuse by applying a seed key encryption algorithm.

Furthermore, various effects that can be directly or indirectly identified through the present disclosure may be provided.

DETAILED DESCRIPTION

Figure 1:
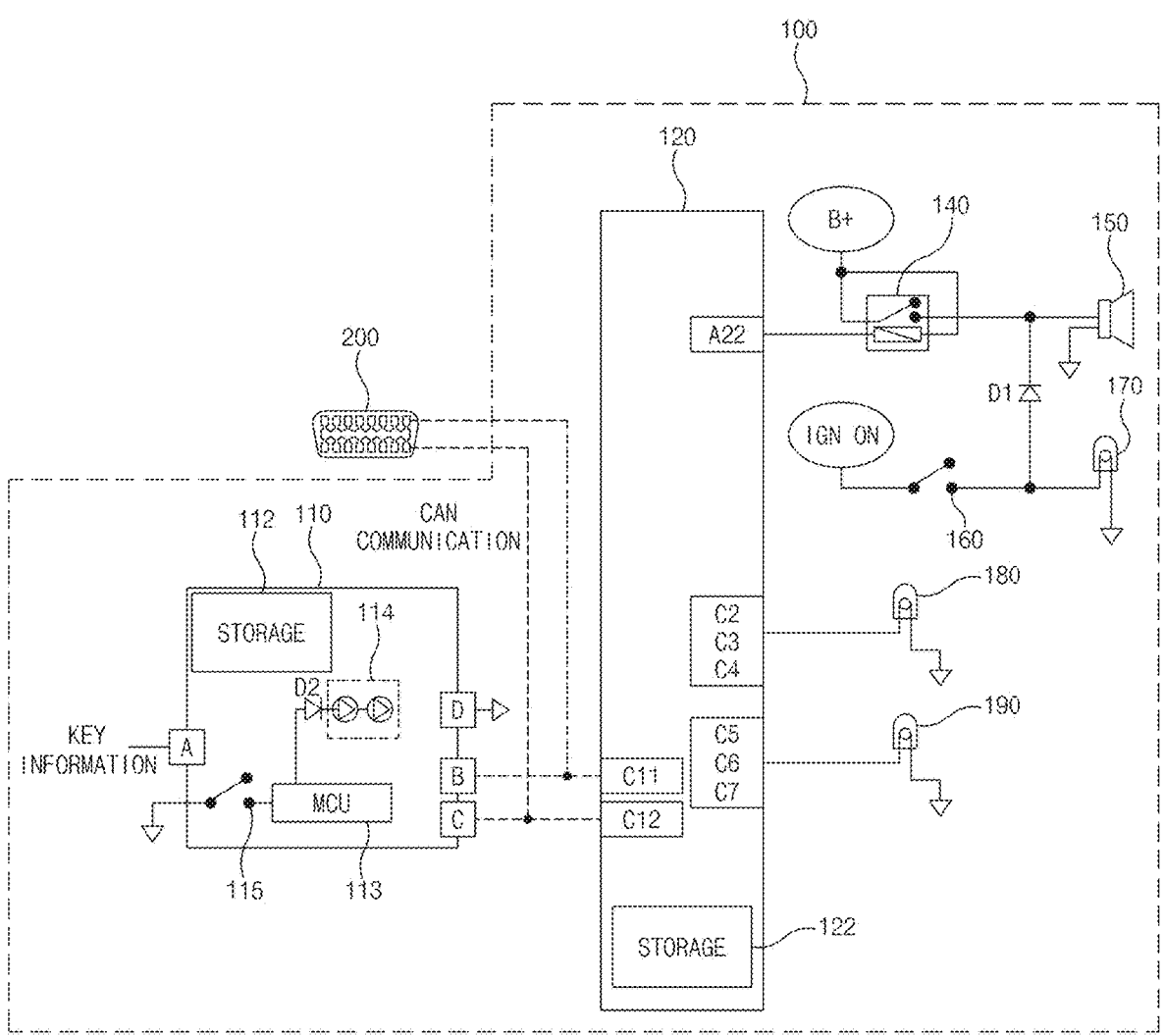
FIG. 1 illustrates a detailed schematic diagram of an example child checking apparatus.

Hereinafter, some embodiments of the present disclosure are described in detail with reference to drawings. It should be noted that in adding reference numerals to constituent elements of each drawing, the same constituent elements have the same reference numerals even though they are indicated on different drawings. In describing an embodiment, where it has been determined that a detailed description of the well-known configuration or function associated with the embodiment may obscure the gist of the present disclosure, such a detailed description has been omitted.

In describing constituent elements according to an embodiment, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as the meanings generally understood by those having ordinary skill in the technical field to which an embodiment of the present disclosure pertains unless they are differently defined. Terms defined in a generally used dictionary shall be construed to have meanings consistent with those in the context of a related art. These terms should not be construed to have idealized or excessively formal meanings unless they are clearly defined in the present specification.

When a component, device, element, or the like, of present disclosure, is described as having a purpose or performing an operation, function, or the like, the component, device, or element should be considered herein as being "configured to" meet that purpose or to perform that operation or function.

Hereinafter, various embodiments of the present disclosure are described in detail with reference to FIGS. 1-6.

Figure 2:
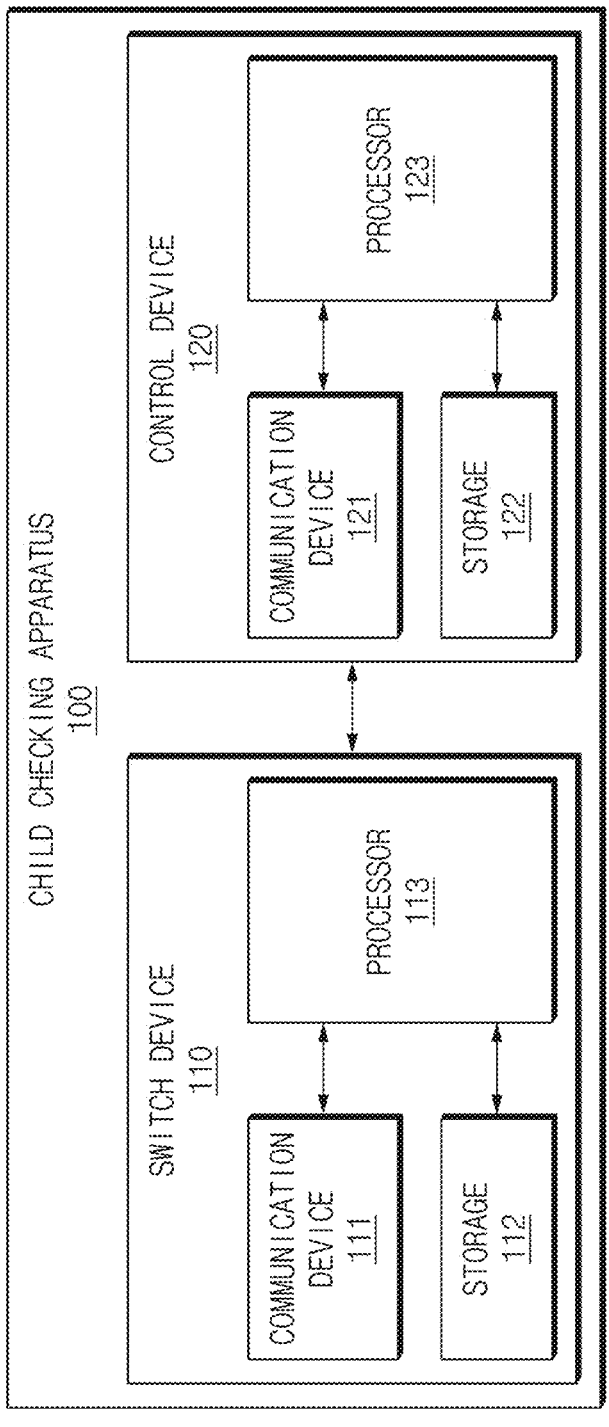
FIG. 2 illustrates a schematic diagram of an example child checking apparatus.

FIG. 1 illustrates a schematic diagram of an example child checking apparatus. FIG. 2 illustrates a detailed schematic diagram of an example child checking apparatus.

The child checking apparatus 100 according to the present disclosure may be implemented inside or outside the vehicle. In this case, the child checking apparatus 100 may be integrally formed with internal control units of the vehicle or may be implemented as a separate hardware device to be connected to control units of the vehicle by a connection means. For example, the child checking apparatus 100 may be implemented integrally with the vehicle, may be implemented in a form that is installed or attached to the vehicle as a configuration separate from the vehicle, or a part thereof may be implemented integrally with the vehicle. Another part may be implemented in a form that is installed or attached to the vehicle as a configuration separate from the vehicle.

The child checking apparatus 100 may perform authentication through communication between a switch device 110 and a control device 120. The control device 120 may determine whether or not the switch device 110 is pressed within a predetermined time period to issue a warning or cancel the warning mode according to a determination result thereof.

Referring to FIG. 1, the child checking apparatus 100 according to an embodiment of the present disclosure includes the switch device 110, the control device 120, a relay 140, a warning sound output device 150, a backup lamp switch 160, a lamp 170, a diode D1, and hazard lamps 180 and 190.

The switch device 110 may transmit an authentication request message to the vehicle control device 120 after a vehicle key is turned off. The switch device 110 may also determine whether to transmit switch information to the vehicle control device 120 by using an authentication response message for the authentication request message received from the vehicle control device 120.

If the authentication request message is received from the switch device 110 after the vehicle key is turned off, the control device 120 may transmit the authentication response message corresponding to the authentication request message and may perform a warning by determining whether the switch device 110 is operated within a predetermined time period.

The relay 140 may be controlled by the control device 120 so that a battery voltage may be transmitted to the warning sound output device 150.

The warning sound output device 150 may output a warning sound. The warning sound output device 150 may include, e.g., a buzzer.

The backup lamp switch 160 may be turned on and off by a user after ignition is turned on.

Lighting of the lamp 170 may be controlled according to turning on and off of the backup lamp switch 160.

Lighting of the hazard lamps 180 and 190 may be controlled by the control device 120. In particular, the hazard lamps 180 and 190 may be turned on to output a warning to a user if the switch device 110 is not pressed within a predetermined time period after the vehicle key is turned off.

The diode D1 may have a first side connected to a node between the relay 140 and the warning sound output device 150 and a second side connected to a node between the backup lamp switch 160 and the lamp 170.

Referring to FIG. 2, the switch device 110 may include a communication device 111, a storage 112, and a processor 113.

The communication device 111 is a hardware device implemented with various electronic circuits to transmit and receive signals through a wireless or wired connection. The communication device 111 may also transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 111 may receive a PIN code by performing can communication if a PIN code is inputted from an external diagnosis device or end of life (EOL) device 200. The diagnosis device or EOL device 200, which is an equipment for inspecting a finished vehicle at a final stage of the vehicle production process, may receive the vehicle identification number (VIN) and the same PIN code matched 1:1 through the diagnosis device or the EOL device 200 at beginning of factory production of the vehicle. In addition, the communication device 111 may communicate with the vehicle control device 120 and transmit or receive an authentication request message and an authentication response message as messages for checking for a sleeping child.

The storage 112 may store data and/or algorithms required for the processor 113 to operate, and the like. As an example, the storage 112 may store a vehicle identification number (VIN) inputted through the diagnosis device or EOL device 200 at the beginning of factory production of the vehicle and encrypted by the processor 113 and a PIN code mapped thereto. In addition, the storage 112 may store the authentication response message received from the control device 120.

The storage 112 may include a storage medium of at least one type among memories of types such as a flash memory, a hard disk, a micro, a card (e.g., a secure digital (SD) card or an extreme digital (XD) card), a random-access programmable ROM (PROM), an electrically-erasable PROM (EE-PROM), a magnetic memory (MRAM), a magnetic disk, and an optical disk.

The processor 113 may be electrically connected to the communication device 111, the storage 112, and the like. The processor 113 may electrically control each component and may be an electrical circuit that executes software commands, thereby performing various data processing and calculations described below.

The processor 113 may process a signal transferred between components of the flight of the switch device 110 to perform overall control such that each component can perform its function normally. The processor 113 may be implemented in the form of hardware, software, or a combination of hardware and software. For example, the processor 113 may be implemented as a microprocessor, but the present disclosure is not limited thereto.

The processor 113 may transmit the authentication request message to the vehicle control device 120 after the vehicle key is turned off. The processor 113 may generate random data to store it in the authentication request message and may convert the PIN code matching the vehicle identification number into a HEX value. The processor 133 may then encrypt the PIN code by calculating the PIN code and random data and may store the encrypted PIN code in the authentication request message. The generation of the authentication request message is described in detail later with reference to FIG. 4.

In addition, the processor 113 may determine whether to transmit switch information to the vehicle control device 120 by using the authentication response message received from the vehicle control device 120.

In other words, in receiving the authentication response message, the processor 113 may compare the PIN code of the authentication response message with the PIN code stored in the storage 12, transmit switch information (e.g., pressed information of the switch device 110) if they match. The processor 113 and may not transmit switch information if the PIN code of the authentication response and the PIN code stored in the storage do not match.

The processor 113 may turn on a lamp of the switch device 110 if the PIN code of the authentication response message matches the PIN code stored in the storage 112 and a lamp lighting command signal is received from the vehicle control device 120.

In addition, as illustrated in FIG. 1, the switch device 110 may include a diode D2, at least one LED 114, and a switch element 115. The diode D2 may be provided between microcontroller units (MCU) of the processor 113. The LED 114 may be controlled and driven by the processor 113. The switch element 115 may be pressed by a user.

The control apparatus 120 may include a communication device 121, a storage 122, and a processor 123.

The communication device 121 is a hardware device implemented with various electronic circuits to transmit and receive signals through a wireless or wired connection and may transmit and receive information based on in-vehicle devices and in-vehicle network communication techniques. As an example, the in-vehicle network communication techniques may include controller area network (CAN) communication, local interconnect network (LIN) communication, flex-ray communication, and/or the like.

As an example, the communication device 121 may receive a PIN code by performing can communication if the PIN code is inputted from the external diagnosis device or end of life (EOL) device 200. The diagnosis device or EOL device 200, which is an equipment for inspecting a finished vehicle at a final stage of the vehicle production process, may receive the vehicle identification number (VIN) and the same PIN code matched 1:1 through the diagnosis device or the EOL device 200 at beginning of factory production of the vehicle. In addition, the communication device 121 may transmit and receive an authentication request message and an authentication response message by performing can communication with the switch device 110.

The storage 122 may store data and/or algorithms required for the processor 123 to operate, and the like. As an example, the storage 122 may store a vehicle identification number (VIN) inputted through the diagnosis device or EOL device 200 at the beginning of factory production of the vehicle and encrypted by the processor 113 and a PIN code mapped thereto. In addition, the storage 122 may store the authentication request message received from the switch device 110.

The storage 122 may include a storage medium of at least one type among memories of types such as a flash memory, a hard disk, a micro, a card (e.g., a secure digital (SD) card or an extreme digital (XD) card), a random access programmable ROM (PROM), an electrically erasable PROM (EE-PROM), a magnetic memory (MRAM), a magnetic disk, and an optical disk.

The processor 123 may be electrically connected to the communication device 121, the storage 122, and the like. The processor 123 may electrically control each component and may be an electrical circuit that executes software commands, thereby performing various data processing and calculations described below.

The processor 123 may process a signal transferred between components of the flight of the switch device 110 to perform overall control such that each component can perform its function normally. The processor 113 may be implemented in the form of hardware, software, or a combination of hardware and software. For example, the processor 113 may be implemented as a microprocessor, but the present disclosure is not limited thereto. For example, it may be, e.g., an electronic control unit (ECU), a microcontroller unit (MCU), or other sub-controllers mounted in the vehicle.

If the authentication request message is received from the switch device 110 after the vehicle key is turned off, the processor 123 may generate an authentication response message corresponding to the authentication request message to transmit it to the switch device 110.

In other words, the processor 123 may calculate and encrypt random data and predetermined constants in the authentication request message to generate the authentication response message and may store the encrypted random data in the authentication response message.

The processor 123 may calculate and encrypt the PIN code and the encrypted random data in the authentication request message and may store the encrypted calculated data in the authentication response message.

The process of generating the authentication response message is described in more detail. The processor 123 may configure the authentication request message and the authentication response message with 8 bytes, may calculate and encrypt 1 to 4 bytes of data and predetermined constants in the authentication request message and may store the encrypted data in 1 to 4 byte positions of the authentication response message.

The processor 123 may calculate and encrypt data of 5 to 8 bytes of the authentication request message and data of 1 to 4 bytes of the authentication response message and may store the encrypted data in 5 to 8 byte positions of the authentication response message.

The processor 123 may perform a warning by determining whether the switch device 110 is operated within a predetermined time period after the vehicle key is turned off. In other words, the processor 123 may enter a warning mode after the vehicle key is turned off, may start a timer count, and may determine whether the switch device 110 operates within a predetermined time period (e.g., 3 min).

The processor 123 may compare the PIN code included in the authentication request message with the PIN code stored in the storage 122. If the PIN code included in the authentication request message and the PIN code stored in the storage 122 do not match, the processor 123 may issue a visual warning or an audible warning.

If the PIN code included in the authentication request message and the PIN code stored in the storage 122 match, the processor 123 may generate an authentication response message corresponding to the authentication request message to transmit it to the switch device 110 and may transmit a lamp lighting command signal to the switch device 110.

The processor 123 may receive a PIN code that is matched one-to-one with the vehicle identification number after the vehicle is manufactured at a factory. The PIN code may be the same as the PIN code stored in the switch device 110.

Figure 3:
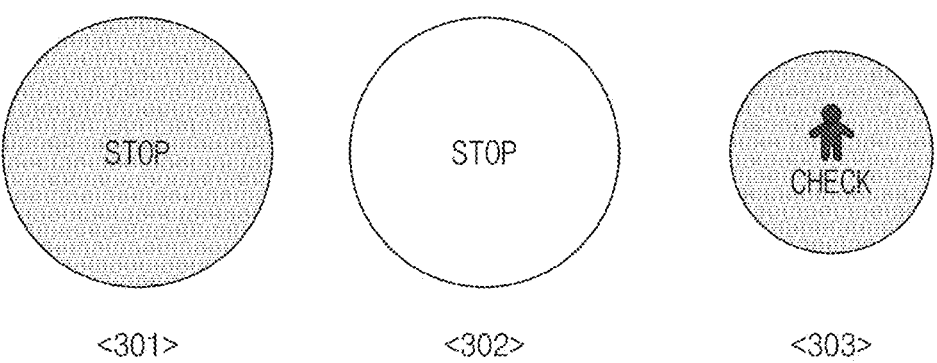
FIG. 3 illustrates an example view showing a button of a child checking apparatus.

FIG. 3 illustrates an example view showing a button of a child checking apparatus. The switch device 110 may be provided inside a button of the child checking apparatus of FIG. 3. A view 301 shows a state in which a LED is turned on before the switch device 110 is pressed and a view 302 shows a state in which the switch device 110 is pressed and the LED is turned off. A view 303 shows another embodiment of the button of the child checking device, which is an example in which a shape of 'child' is shown instead of 'STOP'.

Figure 4:
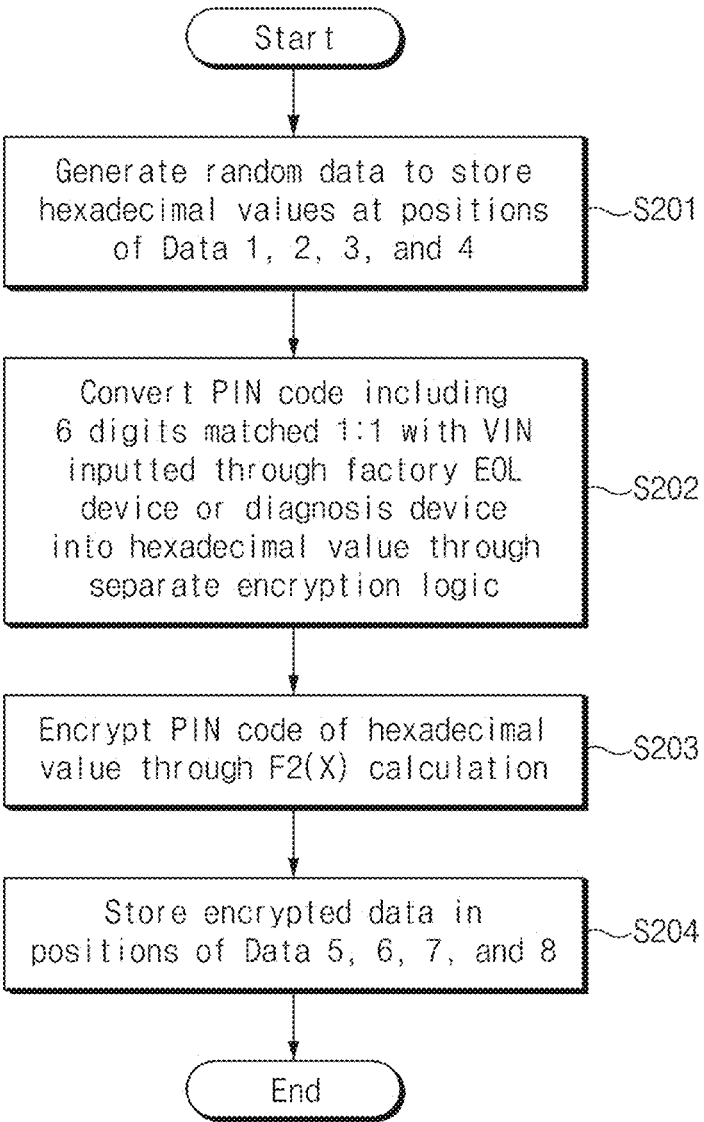
FIG. 4 illustrates a flowchart of an example process for processing an authentication request message.

Hereinafter, a process of storing an authentication request message is described with reference to FIG. 4. FIG. 4 illustrates a flowchart for describing an example of a process for processing an authentication request message.

Hereinafter, it is assumed that the switch device 110 of the child checking apparatus 100 of FIG. 1 performs a process of FIG. 4. In addition, in the description of FIG. 4, operations described as being performed by a device may be understood as being controlled by the processor 113 of the switch device 110.

The switch device 110 may generate random data to store hexadecimal values at positions of Data 1, 2, 3, and 4 (S201). For example, random data may be generated as 5B, 73, 4A, and 5B and the random data may be changed whenever a vehicle key is turned off.

The switch device 110 may convert the PIN code including 6 digits matched 1:1 with the vehicle identification number (VIN) into a hexadecimal value through a separate encryption logic to store it (S202).

For example, if the VIN is 'KMHJK12BP3U456789', the PIN code is displayed as '123456' with 6 digits, and if the PIN code is converted into a hex value, it is 'C6 1F 3F, 9C'.

Subsequently, the switch device 110 may utilize the value converted to a hexadecimal value and random data to encrypt them through a separate mathematical calculation defined in advance with the control device 120 (S203).

Data encrypted through the mathematical calculation may be stored in positions of Data 5, 6, 7, and 8 in a message structure (S204).

The switch device 110 may use random data, and the random data is changed every moment through can communication after a vehicle key is turned off. However, the actual PIN code maintains a constant value.

The control device 120 may equally utilize the random data received from the switch device 110. The switch device 110 and the control device 120 may encrypt random data through a predefined separate mathematical calculation to store it in the positions of Data 1, 2, 3, and 4 in an authentication response message structure.

Figure 6:
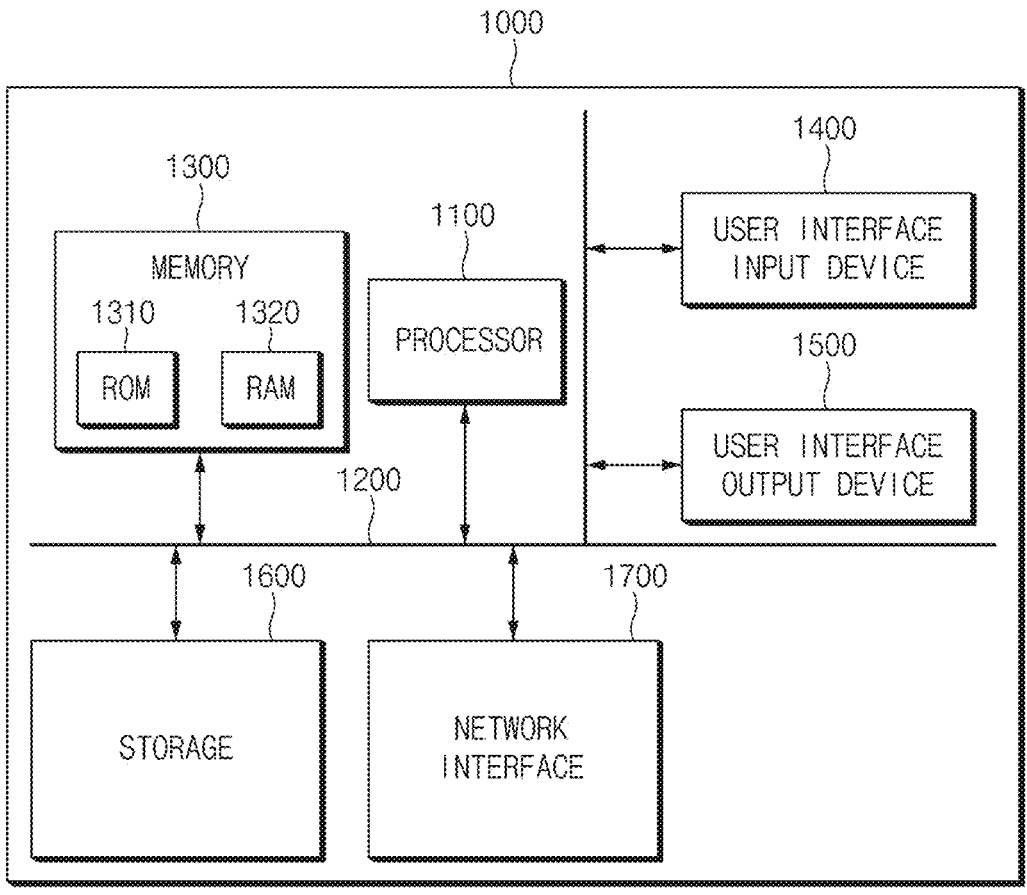
FIG. 6 illustrates an example computing system.

The control device 120 may encrypt the PIN code in the control device 120 through a separate mathematical calculation and stores the encrypted data in the positions of Data 5, 6, 7, and 8. FIG. 4 and FIG. 6 disclose an example in which all 8-byte CAN communication messages are used in the present disclosure. However, the present disclosure is not limited thereto, and the authentication request message and the authentication response message may be configured using only some of the 8 bytes.

Figure 5:
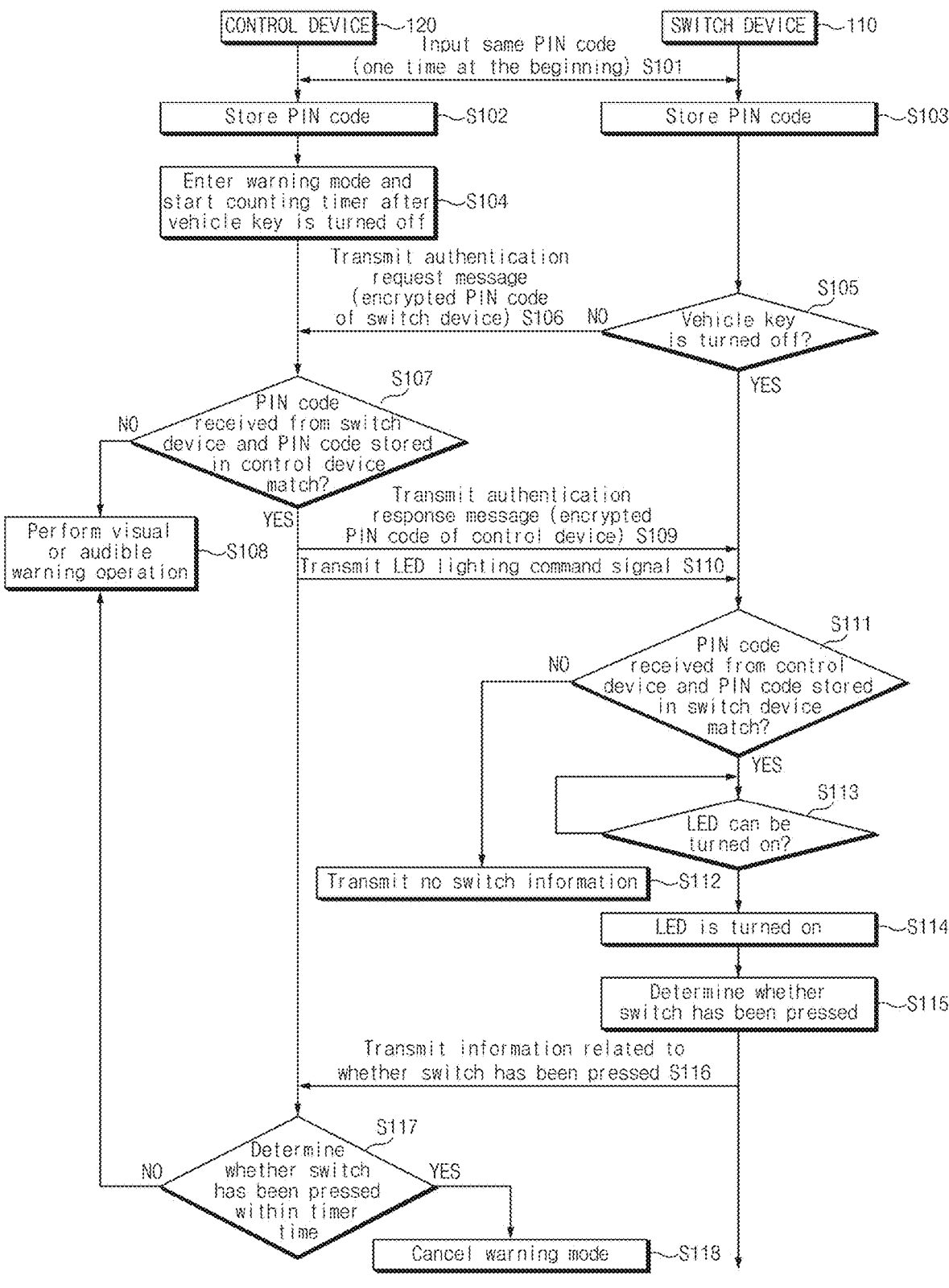
FIG. 5 illustrates a flowchart showing an example child checking method.

Hereinafter, a child checking method according to an embodiment of the present disclosure is described with reference to FIG. 5. FIG. 5 illustrates a flowchart showing an example child checking method.

Hereinafter, it is assumed that the child checking apparatus 100 of FIG. 1 performs processes of FIG. 5. In addition, in the description of FIG. 5, it may be understood that operations described as being respectively performed by the switch device 110 and the control device 120 are controlled by a processor of each of the devices.

Referring to FIG. 5, the switch device 110 and the control device 120 may respectively receive the same PIN code that matches VIN (Vehicle Identification Number) 1:1 through a diagnosis device or EOL device 200 at the beginning of vehicle factory production (S101) and store them respectively (S102 and S103). In this case, the switch device 110 and the control device 120 may each encrypt and store the PIN code.

After the vehicle key is turned off, the control device 120 may enter a warning mode and start a counting timer (S104). In this case, the count of the timer may proceed for 3 min, for example. The warning mode indicates a mode in which logic for checking for a sleeping child is performed.

If the vehicle key is turned off (S105), the switch device 110 may transmit an authentication request message to the control device 120 (S106). In this case, the switch device 110 may transmit the encrypted PIN code to the control device 120.

Accordingly, the control device 120 may compare the PIN code received from the switch device 110 and the PIN code stored in the control device 120 to determine whether they match (S107).

If the PIN code received from the switch device 110 and the PIN code stored in the control device 120 do not match, the control device 120 may perform a visual or audible warning operation (S108). In this case, the visual warning operation may be performed by using, e.g., the hazard lamps 180 and 190. The audible warning operation may be performed through the warning sound output device 150, e.g., a buzzer. In addition, if the PIN code received from the switch device 110 and the PIN code stored in the control device 120 do not match, the control device 120 may transmit the PIN code received from the switch device 110 as an authentication response message as it is.

If the PIN code received from the switch device 110 and the PIN code stored in the control device 120 match, the control device 120 may transmit an authentication response message to the switch device 110 (S109). In this case, the control device 120 may transmit the encrypted and stored PIN code to the switch device 110.

In addition, if the PIN code received from the switch device 110 and the PIN code stored in the control device 120 match, the control device 120 may transmit an LED lighting command signal to the switch device 110 (S110).

Accordingly, the switch device 110 may compare the PIN code received from the control device 120 with the PIN code stored in the switch device 110 to determine whether they match (S111).

Accordingly, if the PIN code received from the control device 120 and the PIN code stored in the switch device 110 do not match, the switch device 110 may not transmit switch information to the control device 120 (S112).

On the other hand, if the PIN code received from the control device 120 and the PIN code stored by the switch device 110 are compared and matched, the switch device 110 may determine whether the LED 114 can be turned on (S113). In other words, the switch device 110 determines that the LED 114 is in a lightable state if the PIN code received from the control device 120 and the PIN code stored in the switch device 110 match, and a LED lighting command signal is received from the control device 120. Accordingly, the switch device 110 turns on the LED 114 (S114).

Subsequently, the switch device 110 may determine whether a switch has been pressed (S115) and may transmit information related to whether the switch has been pressed to the control device 120 (S116).

Upon receiving information related to whether the switch was pressed, the control device 120 may determine whether the switch has been pressed within a desired time of the timer, i.e., a timer time (e.g., 3 min) in step S104 (S117). If a switch is pressed within the timer time, may cancel the warning mode for checking for the sleeping child (S118). If the switch is not pressed within the timer time, a visual or audible warning operation is performed (S108).

As such, it is possible to fundamentally prevent illegal modification of a child checking apparatus by changing the switch device 110 to communication-type software and to prevent abuse by applying a seed key encryption algorithm.

FIG. 6 illustrates an example computing system suitable for use with the disclosed embodiments.

Referring to FIG. 6, the computing system 1000 includes at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a compact disk ROM (CD-ROM).

A storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure. Those having ordinary skill in the art to which the present disclosure pertains may make various modifications and variations without departing from the essential characteristics of the present disclosure.

Therefore, the embodiments disclosed in the present disclosure are not intended to limit the technical ideas of the present disclosure, but to explain them, and the scope of the technical ideas of the present disclosure is not limited by these embodiments. The scope of protection of the present disclosure should be interpreted by the claims below, and all technical ideas within the equivalent range should be interpreted as being included in the scope of the present disclosure.

What is claimed is:

1. A child checking apparatus comprising:
a processor configured to
    receive, from a switch device, an authentication request message including a first Personal Identification Number (PIN) code after a vehicle key is turned off,
    transmit an authentication response message corresponding to the authentication request message based on the first PIN code and a second PIN code, and
    determine whether the switch device operates within a predetermined time period to issue a warning; and
a storage configured to store data driven by the processor, an algorithm, and the second PIN code for encryption,
wherein the second PIN code is matched one-to-one with a vehicle identification number of a vehicle, and
wherein the second PIN code is input to the storage when the vehicle is manufactured.

2. The child checking apparatus of claim 1, further comprising:
a communication device configured to communicate with the switch device to transmit and receive a message for checking for a sleeping child in the vehicle.

3. The child checking apparatus of claim 1, wherein the processor is further configured to:
enter a warning mode; and
start a timer count after the vehicle key is turned off.

4. The child checking apparatus of claim 1, wherein the processor is further configured to compare the first PIN code included in the authentication request message with the second PIN code,
wherein the second PIN code is stored in the storage.

5. The child checking apparatus of claim 4, wherein the processor is further configured to perform a visual warning or an audible warning based on a determination that the first PIN code and the second PIN code do not match.

6. The child checking apparatus of claim 4, wherein the processor is further configured to transmit a lamp lighting command signal to the switch device based on a determination that the first PIN code and the second PIN code match.

7. The child checking apparatus of claim 4, wherein the processor is further configured to generate the authentication response message corresponding to the authentication request message based on a determination that the first PIN code and the second PIN code match.

8. The child checking apparatus of claim 7, wherein the processor is further configured to:
calculate and encrypt random data and a predetermined constant in the authentication request message,
wherein the authentication response message includes the encrypted random data.

9. The child checking apparatus of claim 8, wherein the processor is further configured to:
calculate and encrypt the second PIN code with the encrypted random data.

10. The child checking apparatus of claim 7,
wherein the authentication request message and the authentication response message are made of 8 bytes, and
wherein the processor is further configured to:
calculate and encrypt 1 to 4 bytes of data of the authentication request message and a predetermined constant; and
store encrypted data in positions of 1 to 4 bytes of the authentication response message.

11. The child checking apparatus of claim 10, wherein the processor is further configured to:
calculate and encrypt data of 5 to 8 bytes of the authentication request message and 1 to 4 bytes of the authentication response message; and
store the encrypted data in positions of 5 to 8 bytes of the authentication response message.

12. The child checking apparatus of claim 4, wherein the second PIN code is the same as the first PIN code.

13. The child checking apparatus of claim 1, wherein the processor is further configured to:
determine whether the switch device is pressed within a predetermined time period upon receiving switch pressing information from the switch device;
release a warning mode based on a determination that the switch device is pressed within the predetermined time period; and
perform a visual warning or an audible warning based on a determination that the switch device is not pressed within the predetermined time period.

14. A child checking apparatus comprising:
a processor configured to
    transmit, to a vehicle control device, an authentication request message after a vehicle key is turned off,
    receive, from the vehicle control device, an authentication response message, and
    determine whether to transmit switch information to the vehicle control device by using the authentication response message; and
a storage configured to store data driven by the processor, an algorithm, and a PIN code for encryption,
wherein the authentication request message includes random data and the PIN code which is encrypted,
wherein the PIN code is matched one-to-one with a vehicle identification number of a vehicle, and
wherein the PIN code is input to the storage when the vehicle is manufactured.

15. The child checking apparatus of claim 14, further comprising a communication device configured to:
communicate with the vehicle control device to transmit; and
receive a message for checking for a sleeping child in the vehicle.

16. The child checking apparatus of claim 14, wherein the processor is further configured to:
compare a first PIN code of the authentication response message with a second PIN code stored in the storage in receiving the authentication response message;
transmit switch information based on a determination that the first PIN code and the second PIN code match; and
transmit no switch information based on a determination that the first PIN code and the second PIN code do not match, wherein the PIN code includes the first PIN code and the second PIN code.

17. The child checking apparatus of claim 16, wherein the processor is further configured to:

light a lamp of a switch device based on a determination that the first PIN code and the second PIN code match; and receive a lamp lighting command signal from the vehicle control device.

18. The child checking apparatus of claim 14, wherein the processor is configured to:

convert the second PIN code matching a vehicle identification number into a hexadecimal value; and calculate the second PIN code with the random data to encrypt the second PIN code.

19. A child checking method comprising:

receiving, by a processor, an authentication request message including a first Personal Identification Number (PIN) code from a switch device after a vehicle key is turned off;

transmitting, by the processor, an authentication response message corresponding to the authentication request message based on the first PIN code and a second PIN code;

determining, by the processor, whether the switch device operates within a predetermined time period; and performing, by the processor, a warning according to a determination result thereof, wherein the second PIN code is matched one-to-one with a vehicle identification number of a vehicle, and wherein the second PIN code is input to a storage when the vehicle is manufactured.

\* \* \* \* \*